United States Patent
Hagen

[11] 3,777,479
[45] Dec. 11, 1973

[54] CONTROL SYSTEM FOR GAS TURBINE ENGINES

[75] Inventor: Hermann Hagen, Dachau, Germany

[73] Assignee: Motoren-Und Turbinen-Union Munchen GmbH, Munich, Postfach, Germany

[22] Filed: Dec. 18, 1970

[21] Appl. No.: 99,358

[30] Foreign Application Priority Data
Dec. 18, 1969 Germany.................. P 19 63 432.3

[52] U.S. Cl....... 60/39.25, 60/39.16 R, 60/39.28 R, 60/235, 60/242, 60/243
[51] Int. Cl. ............................................. F02c 9/04
[58] Field of Search ..................... 60/39.28, 39.28 T, 60/39.25, 235, 242, 243

[56] References Cited
UNITED STATES PATENTS

| | | | |
|---|---|---|---|
| 2,422,808 | 6/1947 | Stokes............................ | 60/39.28 T |
| 2,593,536 | 4/1952 | Chamberlin..................... | 60/39.28 T |
| 2,601,777 | 7/1952 | Woodward...................... | 60/39.28 T |
| 3,048,013 | 8/1962 | Bevers............................ | 60/39.28 T |
| 3,316,713 | 5/1967 | Urban.............................. | 60/243 X |
| 3,078,670 | 2/1963 | Werner........................... | 60/39.28 R |
| 3,295,316 | 1/1967 | Beatrice......................... | 60/39.28 R |
| 3,357,177 | 12/1967 | Cornett.......................... | 60/39.28 R |
| 3,498,058 | 3/1970 | Greune............................ | 60/39.28 |
| 3,521,446 | 7/1970 | Malganian...................... | 60/39.28 R |

Primary Examiner—Clarence R. Gordon
Attorney—Craig and Antonelli

[57] ABSTRACT

A control system for gas turbines comprising a gas generator associated with a variable geometry unit such as variable guide vanes upstream of the free-power turbine of a two-shaft engine having a heat exchanger or a variable geometry thrust nozzle for a turbojet engine. The control system adjusts the working line of the gas generator to each related speed by variation of the geometry by utilizing the function $$q_1 \cdot p_{o1} = f(T_{o1}) \cdot p_{o3}^\alpha \, k$$

for positioning the gas generator working line and for limiting acceleration or fuel supply.

35 Claims, 11 Drawing Figures

INVENTOR
HERMANN HAGEN

BY Craig, Antonelli, Stewart & Hill

ATTORNEYS

CONTROL SYSTEM FOR GAS TURBINE ENGINES

BACKGROUND OF THE INVENTION

The present invention relates to a control system for gas turbines with a gas generator followed by a unit with variable geometry, e.g. variable stator vanes upstream of the power turbine of a two-shaft turbine which may be provided with a heat exchanger for transferring the exhaust heat to the air compressed in the gas generator or followed by a variable geometry thrust nozzle in the case of a turbojet engine, where the gas generator working line is adjusted suitably to any speed by the associated variable geometry through the regulator.

In the course of the development of gas turbine fuel control systems, it has been an aim to find parameters allowing simple control systems to be designed for providing reliable control in both the steady state condition and for maximum acceleration and deceleration. Nevertheless, most of the modern control systems require a number of components which must interact accurately and reliably within the system. In many cases where no suitable control parameters are available, control systems combined with governor circuits are employed.

The task of providing a suitable control system becomes particularly difficult in the case of open cycle gas turbines featuring heat exchangers. In this case, the heat supply downstream of the compressor does not solely depend upon the heat added in the combustion chamber but also upon the heat transferred in the heat exchanger. The temperature upstream of the turbine results from this combined heat supply. This heat supply may only be increased to a point determined by the power requirements and cmpatible with material strength and compressor surge limit. With jet engines, similar control problems were encountered. In this case, the thrust nozzle area must be variable to ensure high efficiencies at different degrees of afterburning and to adapt the nozzle area to the increasing volume of combustion gases.

When the gas turbine is used as a prime mover for land vehicles, it is advantageous to arrange a free-power turbine downstream of the gas generator. If low fuel consumption under off-design conditions is desired, the free-power turbine is equipped with variable inlet guide vanes so that the gas generator back pressure and at the same time its turbine inlet temperature can be influenced. Thus, in the upper power range, a higher turbine inlet temperature becomes possible than would be the case with constant guide vane throat area. When controlling the working line this way, the surge limit and the maximum permissible turbine inlet temperature must also be considered. U.S. Pat. No. 3,316,713 has the same objective. In this patent, for example, the ratio between two pressure differences in the compressor and the proportion $n_1 \sqrt{T_{01}}$ were used as control parameters. For the control of the system the ratio of the pressure differences $$P_{o2} - P_{o1}/P_{o2} - P_2 = f(n_1)/\sqrt{T_1}$$

must be written as a function of the above proportion. Thus, it becomes possible to set the working point satisfying the given function by means of guide vane variation. The accuracy of the control system thus depends upon the given function.

The symbols and indices used in the equations have the following meaning:

SYMBOLS

| | | |
|---|---|---|
| $G_L$ | Air mass flow | kg/s |
| N | Power | PS |
| B | Fuel consumption | kg/h |
| T | Temperature | °K |
| $F_1$ | Control area for $P_{o3}$ | m² |
| $F_2$ | Control area for ($p_{o1} \cdot q_1$) | m² |
| p | Pressure | kg/m² |
| q | Ram pressure | kg/m² |
| $n_1$ | Gas generator speed | rpm |
| $n_2$ | Speed of free power turbine | rpm |
| $x, y \ldots z_n$ | Constants | |
| $a, b \ldots z$ | Constants | |
| $\alpha, \beta \ldots \delta$ | Exponent | |

INDICES

| | |
|---|---|
| 00 | Environmental conditions |
| 01 | Total condition upstream of compressor |
| 02 | Total condition downstream of compressor |
| 03 | Total condition upstream of gas generator turbine |
| 04 | Total condition downstream of gas generator turbine |
| T | Ambient temperature and pressure with respect to standard day temperature and pressure of 15° C and 760 mm Hg. |
| V | Full load |
| L | Stator assembly |
| 1 | Compressor intake static conditions |
| 010,030 | With suffix 0 relating to standard day |

SUMMARY OF THE INVENTION

An object of the present invention is to adjust the working line by means of a control system in such a manner as to avoid the compressor surge line. This control system is to operate on all parameters which, also under transient operating conditions, ensure an accurate and rapid control of the fuel supply and the variable geometry, e.g. of the guide vane throat area upstream of the power turbine.

Another object of the present invention is to provide a control, wherein a product obtained from measured values is considered to be equal to a constant.

In the present invention, the foregoing objects are achieved by using the function $q_1 \cdot p_{o1} = f(T_{o1}) \cdot p_{o3}^{\alpha} \cdot k$ for positioning the gas generator working line and for a limitation of acceleration or fuel supply, where $q_1$ is the ram pressure $p_{o1}$ the total pressure, $T_{o1}$ the absolute temperature upstream of the compressor, $p_{o3}$ the total pressure as measured downstream of the compressor or between compressor and turbine and $\alpha$ and $k$ each are constants.

Another feature of the present invention resides in that the extended function $q_1 (x \cdot p_{o1}^{\alpha} + y \cdot p_{o1}^{\beta} + \ldots + z_n \cdot p_{o1}^{\delta}) = f(T_{o1}) \cdot (a \cdot p_{o3}^{\alpha} + b \cdot p_{o3}^{\beta} + \ldots + z \cdot p_{o3}^{\zeta}) \, k$ is used for positioning the working line, where $x, y, z_n, k, a, b, z, \alpha, \beta, L$ are constant values.

A further characteristic of the present invention resides in that the linear temperature function $f(T_{o1})$ is considered to be equal to a constant below a given temperature $T_{o1}$.

Another featuer of the present invention consists in that a linear temperature function $F(T_{o1}) = K_2 [T_{oo} + (T_{o1} - T_{oo})]$ is selected starting from a certain ambient temperature $T_{oo}$, wherein $K_2$ is a constant and $T_{o1}$ designates the intake temperature.

In another characteristic of the present invention, a control circuit for the variable geometry and, in addition, a control circuit for the gas generator speed for positioning the working line are provided, wherein the variable geometry control circuit comprises the measuring points for the values $p_{o1}$ (compressor intake total pressure) and $q_1$ (compressor intake ram pressure), a first multiplying device converting these measured values into a signal proportional to the function used for positioning the working line and a function generator, wherein the signal is compared with a second signal produced in the second multiplying device by multiplication of $p_{o3}$ and $T_{o1}$ according to the control function. Moreover, the differential signal generated by the function generator is used as a control impulse for variation of the geometry and where, in the speed control circuit provided additionally, a speed regulator controlling the fuel flow is included for comparing the gas generator speed signal with the value selected by the power control lever which in addition is influenced by the speed of the free-power turbine within certain operating ranges.

Further features of the present invention are as described as follows. From a thermodynamic calculation, it has been found that for a working line which approximates a line with the constant temperature ratio $T_{o3}/T_{o1}$ the function $$P_{o3}^2 / q_1 \cdot p_{o1} = \text{constant}$$

(Equation 1)

applies. For taking into account the position of the surge limit, it is recommended to select the function $$P_{o3}^\alpha / q_1 \cdot p_{o1} = \text{constant}$$

(Equation 2)

The exponent $\alpha$, however, does not deviate considerably from value 2 (see Equation 1). When transferring the equation $$q_1 \cdot p_{o1} = K \cdot p_{o3}^\alpha$$

(Equation 3)

it will be found that a control function is obtained. Instead of $p_{o3}$, a pressure can be used sensed downstream of the compressor or between compressor and gas generator turbine. In the following, a working line based on these function will be described. The presentation of the working line in the compressor characteristics, with the compressor pressure ratio $\pi_v$ plotted as a function of $G_L \cdot \sqrt{T_{o1}}/p_{o1}$ and as a function of proportion $n_1/\sqrt{T_{o1}}$ is generally known. When lines for constant temperature ratios $T_{o3}/T_{o1}$ and the surge limit are entered, it becomes clear that the temperature ratio in the middle speed range must be reduced in order not to get too close to the surge limit.

On the other hand, it will be attempted to keep the temperature ratio under off-design conditions and, thus, under reduced gas generator speed approximately at the same level as under full load speed. The working line will therefore be bent somewhat to keep away from the surge limit. For better adaptation to the operation conditions the function $q_1 \cdot (x \cdot p_{o1}^\alpha + y p_{o1}^\beta + \ldots + z_n p_{o1}^\delta) = K \cdot p_{o3} \cdot (a p_{o3}^\alpha + b p_{o3}^\beta + \ldots) z p_{o3}^\delta$ (Equation 4)

is suited even better. Since the function defines a unique line in the compressor characteristics, a working line is obtained from the thermodynamic similarity which modifies temperature $T_{o3}$ at the turbine inlet as a function of intake temperature $T_{o1}$ and proportion $n_1/\sqrt{T_{o1}}$. With increasing intake temperature $T_{o1}$, a corresponding increase in turbine intake temperature $T_{o3}$ would occur which, however, is limited by blade strength and high temperature resistance. To take this into account, the working line is also to be shifted progressively with increasing intake temperature. This of intake temperature $T_{o1}$ so that the following equation is obtained:

$$q_1 \cdot p_{o1} = f(T_{o1}) \times p_{o3}^\alpha$$

(Equation 5)

At a later stage, it will be more fully explained that it is convenient to use the function $$f(T_{o1}) = k_2 \cdot T_{o1}$$

(Equation 6)

for intake temperatures which exceed a certain value. In this equation $k_2$ is a constant. When turbine outlet temperature $T_{o4}$ is also accounted for, Equation 5 is extended as follows:

$$p_{o1} \cdot q_1 = T_{o4} \cdot [f(T_{o1}) \cdot p_{o3}^\alpha ]$$

(Equation 5')

Having established the control function of the working line, the further interaction between control components will be explained by way of example concerning a gas turbine and the associated free-power turbine. In the operating characteristics of the gas turbine with free-power turbine, a stationary working point is established by the speed of gas generator and free-power turbine and by the angle position of the variable guide vanes. Due to the control law presented by one of the proposed functions, each gas generator speed $n_1$ is related to a certain guide vane position. Thus, the only way of influencing the gas generator is via its speed. All the other relationships result therefrom. The only independent element is the speed of the free-power turbine which is to be kept within a certain range. For starting the vehicle or the plant from standstill, the free-power turbine must also be accelerated from standstill and its speed in the operating range must then be kept within a certain range depending upon the gas generator turbines.

For the upper and lower speed limit, a fixed relationship between the speeds of gas generator and free-power turbine is to be selected depending upon the gearbox used. The upper speed limit, however, is overridden by a speed limit determined by the strength of the free-power turbine material, which is independent from the gas generator speed. In the top gear this speed will correspond to the maximum permissible travelling speed. The control system must therefore be provided with a device for the limitation of the free-power turbine speed $n_2$ to limit the travelling speed. This device can be extended when it is desired to control the travelling speed rather than the power by means of the power control lever. In this case, a function generator for $n_2$ controlling the necessary $n_1$ would have to be operated by the control lever. When $n_2$ deviates from predetermined values, a signal can indicate the necessity to change into another gear and this signal can be used for automatic changeover.

In certain operating ranges, e.g. when starting the engine and decelerating the free-power turbine, the proposed control function must be overridden. When the power control lever is in the idling position which also is the starting position, then the related guide vane position must ensure a low gas generator back pressure. For braking, the guide vanes must be so positioned that they retard the free-power turbine and have a throttling effect upon the gas generator whereby the gas generator speed can be progressively increased. The function as given in Equation 4 or 5 can also be utilized for acceleration control of a single or multishaft engine. In this case, the function serves to control the maximum amount of fuel as a function of the control parameters. It will be easily understood that this control is independent from the specific gravity of the fuel which in conventional control systems can be considered to a certain degree only.

In the above, major consideration was given to the gas turbine with free-power turbine and variable guide vanes. The gas generator working line is positioned by means of the fuel metering and variable guide vane system according to the function proposed. Similarly, also the working line of a turbojet engine both with and without afterburning can be positioned on the basis of the above control law through a variable thrust nozzle.

For a single shaft gas turbine with shaft power offtake, the proposed control function can advantageously be employed for limitation of the acceleration or temperature load, respectively, and for avoiding the surge limit. The pressures used represent, immediately and without noticeable delay, the flow and power condition of the gas turbine and respond more rapidly than temperature indicating devices. Moreover, the control function corresponding to the law of similarlity is suitable fo positioning the working line or acceleration limit so that the surge limit is avoided under all circumstances.

BRIEF DESCRIPTION OF THE DRAWING

These and further objects, features and advantages of the present invention will become more apparent from the following description when taken in conjunction with the accompanying drawing which shows, for purposes of illustration only, several embodiments in accordance with the present invention and wherein.

DETAILED DESCRIPTION OF THE DRAWING

Figure 1:
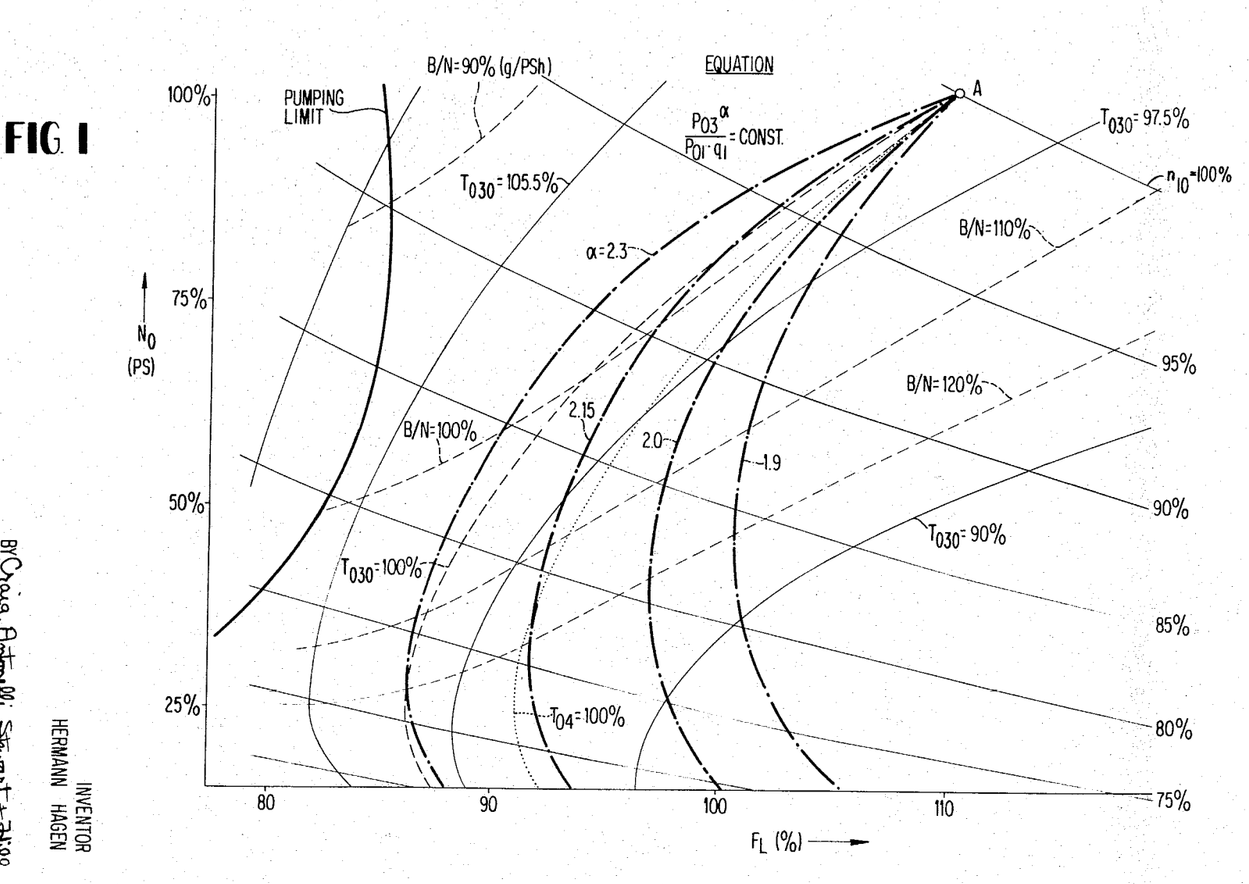
FIG. 1 is a graph showing the interaction between the various control parameters, wherein power $N_o$ related to standard day conditions is plotted at the ordinate variable guide vane area $F_1$ of the free-power turbine plotted at the abscissa.

Referring now to the drawing, FIG. 1 is a diagram showing the interrelationship wherein:

i. Power $N_o = N_T \cdot \sqrt{T_{.10}/P_{o1}} \cdot \sqrt{T_{o1}} \cdot p_{o1o}$ related to standard day and the following curves are entered (for standard day):
ii. Curves representing constant temperature $T_{o3o} = T_{o3} \cdot T_{o1o}/T_{o1}$
iii. The curve representing constant temperature $T_{o4}$,
iv. Curves for constant specific fuel consumption $B/N$,
v. Curves for relative gas generator speed $n_{1o}$,
vi. Working lines to $p_{o3}{}^\alpha /p_{o1} \cdot q_1 =$ const. with various exponents $\alpha$ starting from the same full load point A and
vii. the surge line, wherein $T_{o3o} =$ gas generator turbine inlet temperature related to standard day.

$T_{o1o} =$ the compressor intake temperature related to standard day.

$T_{o1} =$ the actual intake temperature.

$T_{o3} =$ the actual gas generator turbine inlet temperature.

$T_{o4} =$ the actual gas generator turbine outlet temperature $B =$ fuel consumption per time unit.

$N =$ power of the free-power turbine.

$n_{1o} = (n_1/n_{1V}) \cdot (T_{o1o}/T_{o1}) \cdot 100$ percent $n_1 =$ gas generator speed.

$n_{1V} =$ gas generator speed under full load conditions. From FIG. 1 which represents a calculated example, it can easily be seen that a working line with the exponent $\alpha = 2.15$ results in a nearly constant temperature $T_{o3o}$, related to standard day, and a favourable distribution of the specific fuel consumption in the upper speed range. The surge limit is avoided.

With a control function according to Equation 4, a still higher adaptability could be obtained when it is desired to position the working line closer to line $T_{o3o} =$ constant. For a constant value of $n_{1o}$, the turbine inlet temperature decreases over the whole operating range when the intake temperature falls below a certain value. On the other hand, turbine inlet temperature $T_{o3}$ would increase when an increase in intake temperature $T_{o1}$ occurs. This condition, however, must be avoided to prevent a reduction in turbine blade strength. This is achieved by a progressive shift of the working line with increasing intake temperature, which can be expressed by $$q_1 \cdot p_{o1} = f(T_{o1}) \cdot p_{o3}{}^\alpha$$

(Equation 5)

i.e., the constant in Equation 3 or 4 is replaced by a function of $T_{o1}$. Function $f(T_{o1}) = K_2 \cdot T_{o1}$ (Equation 6)

is preferred for intake temperatures exceeding a certain initial value. Thus is can also be written:

$$f(T_{o1}) = [T_{oo} + (T_{o1} - T_{oo})] K_2$$

(Equation 7)

where only positive values of $T_{o1} - T_{oo}$ apply. Thus, the temperature function is based upon ambient temperature $T_{oo}$ and then rises linearly according to Equations 6 and 7. In the case of leakage or air bleed between compressor and gas generator turbine, a higher temperature level would be obtained with the function selected. If the gas turbine were operated at this temperature for a prolonged period, damage and a reduction in life would result. In order to avoid this, a temperature sensor is provided which shifts the working line towards a lower average temperature, when the selected maximum temperature in the operating range is exceeded. Thus, it is ensured that the control system automatically adapts itself to the desired temperature level.

Figure 2:
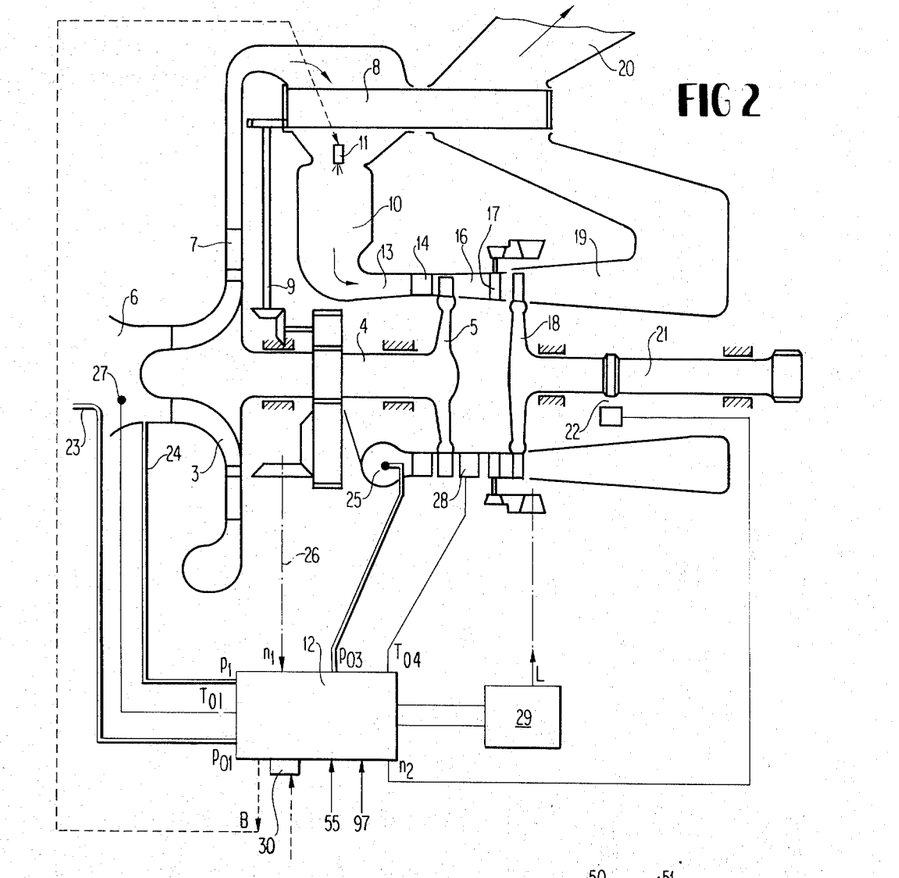
FIG. 2 is one embodiment for the general arrangement of the gas turbine and free-power turbine with the measuring points of the control parameters.

The general arrangement in FIG. 2 shows a gas turbine engine with a gas generator comprising centrifugal compressor wheel 3 and turbine wheel 5 on a common shaft 4. The air drawn in through intake 6 flows to regenerative heat exchanger 8 after passing compressor wheel 3 and stator 7. The heat exchanger is driven via gear 9 by common shaft 4. The air heated in the heat exchanger enters combustion chamber 10, where fuel from regulator 12 is injected through nozzle 11. The combustion gases from the combustion chamber are guided through duct 13 into the stator 14 of the gas generator turbine and then impart their force onto gas generator turbine wheel 5. The gases then pass through diffusor 16 to variable stator 17 of free-power turbine 18 and flow via diffusor 19 and heat exchanger 8 into exhaust duct 20. The power of the free-power turbine 18 is transmitted through shaft 21 which is fitted with an impulse generator 22, thereby providing a free-power turbine speed ($n_2$) signal for regulator 12.

Figures 4A, 9:
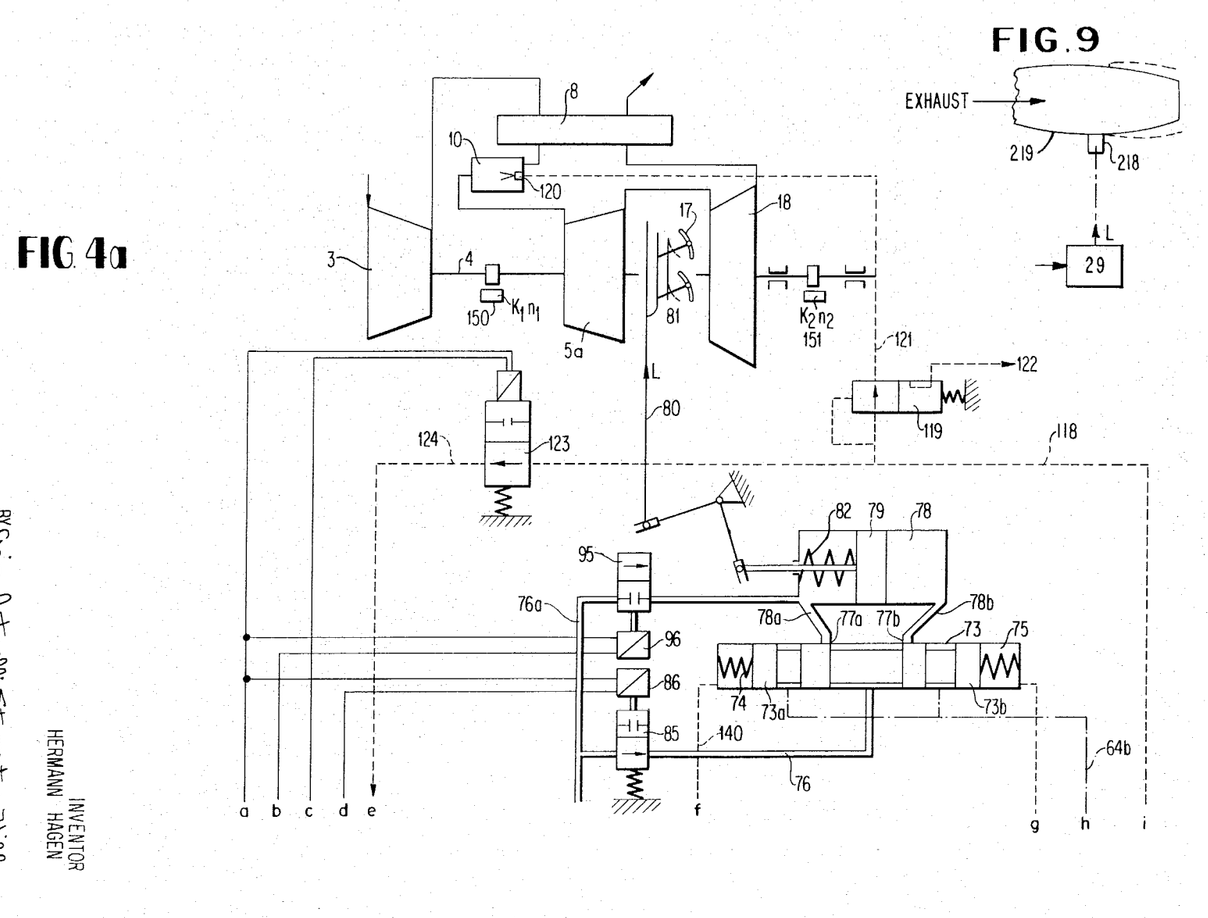
FIGS. 4a to 4c show adjoining sections of a schematic of the control system according to the present invention which is operated hydromechanically, these figures being interconnected at points $a$-$i$ and $a'$-$d'$.
FIG. 9 is a schematic block diagram of a modification of the FIG. 2 embodiment with control of a variable geometry thrust nozzle of a turbojet engine.

For operation of regulator 12 on the basis of the proposed function and the correction parameters, total pressure $p_{o1}$ must be measured at the intake by pressure sensor 23, and the static pressure $p_1$ by sensor 24. The difference between the sensor pressures results in ram pressure $q_1 = p_{o1} - p_1$. Sensor 25 for total pressure $p_{o3}$ is fitted at the inlet of the gas generator turbine. It can be replaced by sensors between the compressor and gas generator turbine. The gas generator speed ($n_1$) impulse is fed into the regulator via gear 26 which also provides the drive of fuel pump 30. For the correction of the control function, intake temperature $T_{o1}$ is measured additionally (by means of resistance thermometer 27). For shifting the working line upon variation of the other engine parameters, temperature $T_{o4}$ prevailing in the gas generator turbine section is required. Thermocouple 28 downstream of the gas generator turbine is used. Arrows 55 and 97 represent the accelerator pedal and brake pedal. Between regulator 12 and the variable stator 17 an actuating system L with servo device 29 is required. As shown in FIG. 9, the actuating system L with servo device 29 may be utilized for controlling the variable geometry thrust nozzle 218 of a turbojet engine L19.

Figure 3:
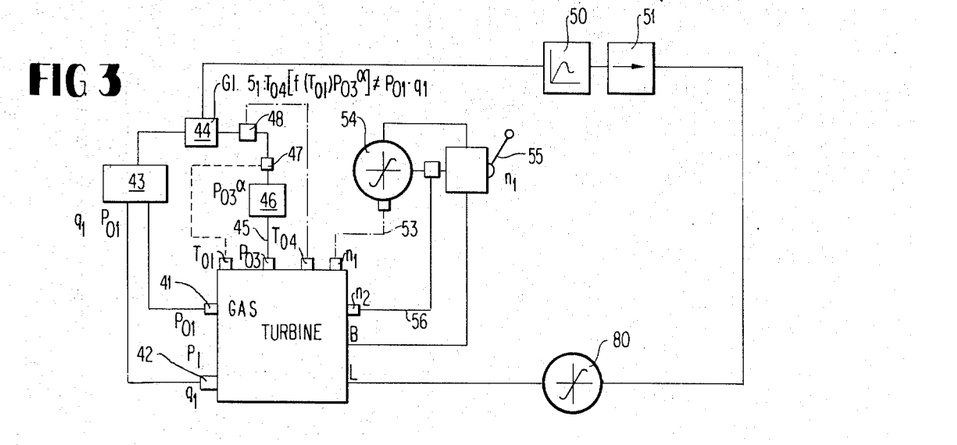
FIG. 3 is a block diagram of the control system of the two-shaft gas turbine with variable guide vanes upstream of the free-power turbine.

The block diagram in FIG. 3 shows two control circuits. At first, the control circuit for guide vane variation will be considered. The gas turbine is provided with measuring points 41 (sensor 23) for $p_{o1}$ and 42 (sensor 24) for $p_1$ which provide $q_1$. In multiplying device 43, a signal is generated proportional to function $q_1 (xp_{o1}{}^\alpha + yp_{o1}{}^\beta + \ldots)$ which is fed into function generator 44. Moreover, $p_{o3}$ (45) is picked-up on the gas generator and converted into signal $p_{o3}{}^\alpha$ or $p_{o3}$ ($ap_{o3}{}^\alpha + bp_{o3}{}^\beta + \ldots$) in regulator 46.

After multiplication of the last-named signal with a function of the temperature $T_{o1}$ in multiplying device 47 and multiplication of the received product with the gas generator turbine outlet temperature $T_{o4}$ in multiplying device 48, the signal, leaving this device 48, is compared in function generator 44 with the signal from the multiplying device 43 as determined by equation $5_1$. The resulting differential signal is used as a control impulse 50 which is amplified in amplifier 51 and then fed into guide vane actuating device 80(29). The gas turbine guide vane adjustment ensures the setting of the working line which corresponds to the input control function. Another control circuit controls the gas generator speed $n_1$ or fuel supply B, respectively. Gas generator speed 53 is compared with the values selected with power control lever 55 in speed governor 54, which results in the necessary amount of fuel B. In addition, free-power turbine speed $n_2$ (56) is measured which, when exceeding a certain value, is used to reduce gas generator speed $n_1$. It is thus clear that the energy source being the major speed controlling factor is also reduced.

Figure 4B:
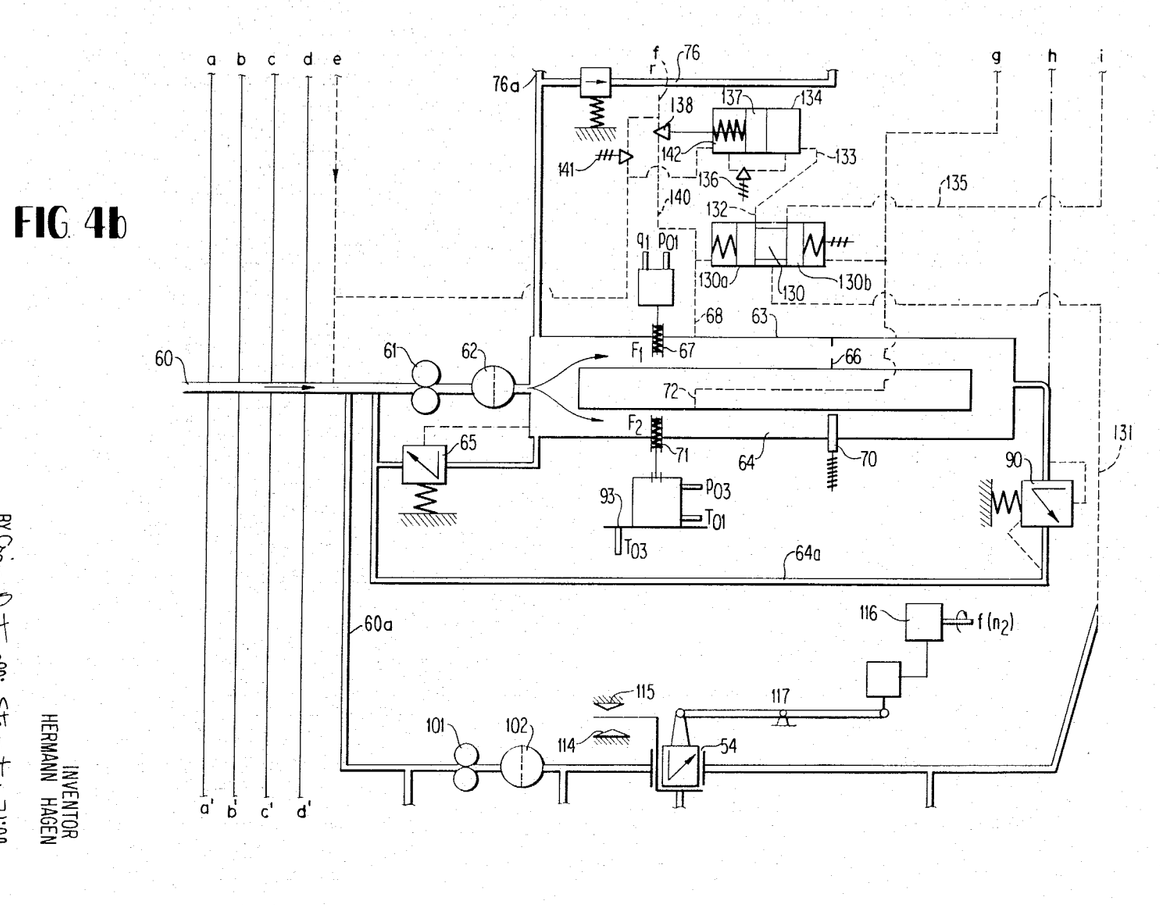
Figure 4C:
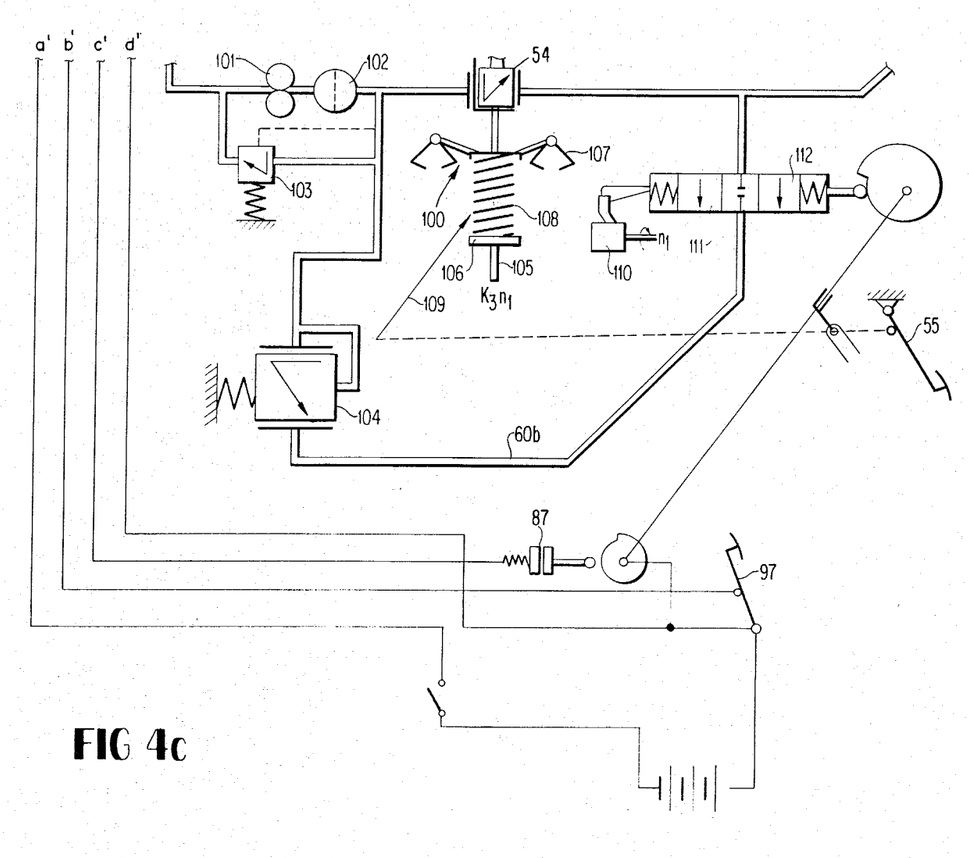

FIGS. 4a–c show the details of a schematic embodiment of the control system according to the present invention which, for example, can comprise hydromechanical components, FIGS. 4a and 4b being interconnected at points a–i and FIGS. 4b and 4c being interconnected at points. A'–D'. For this control system electronic, mechanical, hydraulic components and/or combinations thereof can be employed without modifying the subject matter of the present invention. As can be seen from FIG. 4a, centrifugal compressor 3a with shaft 4 and gas generator turbine 5a combustion chamber 10, regenerative heat exchanger 8 and variable stator assembly 17 of free-power turbine 18 are shown schematically. As can be seen in FIG. 4b the fuel leaves the tank at 60 and then the flow is split-up and directed to the variable guide vane control circuit and the speed control circuit. At first, the variable guide vane control circuit is considered which can also be operated with oil instead of fuel completely separate from the speed control circuit. The fuel is supplied to two comparative measuring tubes 63, 64 through pump 61 and filter 62. The system is provided with pressure relief valve 65. Line 64a with pressure relief valve 90 connects both the fuel supply line 60 and the relief valve 65 and also the outlet of the comparative measuring tubes which again is connected to control cylinder 73 (see FIG. 4a) via line 64b (see FIGS. 4B and 4A).

Figure 6:
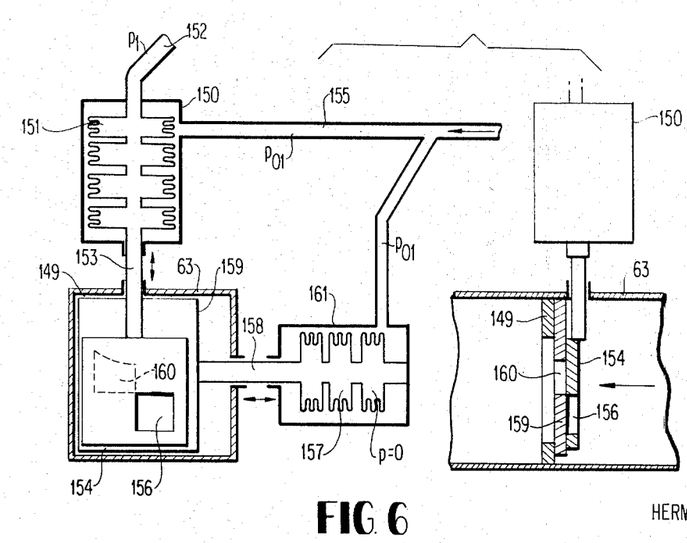
FIG. 6 is a front and side view of a second multiplying device.

Comparative measuring tube 63 comprises a constant area orifice 66 and orifice 67 with its area depending upon measured values $p_{o1}$ and $q_1$. In FIG. 6, a more detailed explanation is given by way of an example wherein area $F_1$, 67 is obtained which, for example, is proportional to the product of measured values $p_{o1}$ and $q_1$. The pressure downstream of control area $F_1$ is sensed at 68. Similarly, an adjustable orifice 70 and control orifice 71 ($F_2$) are provided in comparative measuring tube 64. The latter selects an area which is proportional to $p_{o3} T_{o1}$ and $T_{o3}$.

The pressure downstream of control orifice 71 is sensed at 72. The pressures and measuring points 68 and 72 are equal when the areas 67 and 71 are equal or adjusted to a certain ratio. When each of the areas is proportional to one of the two sides of the control function according to Equation 5

$$F_1/F_2 = q_1 \cdot p_{o1}/f(T_{o1}) \, p_{o3}{}^\alpha = \text{constant}$$

(Equation 8)

then the pressures in the control circuit must be balanced. When the orifice area $F_1 = f(p_{o1} \cdot q_1)$ is too small as compared to $F_2 = f(T_{o1}) \, p_{o3}\alpha$ the pressure at 68 becomes lower than the pressure at 72. The pressures as sensed at measuring points 68 and 72 are fed into cylinder 73 where they act both upon control piston 73a and control piston 73b which is connected to control piston 73a, against the force of springs 74, 75 locating against the cylinder bottoms opposite each other. The central annular groove of the control piston provides control edges 77a and 77b across which the hydraulic fluid from line 76 flows into connection lines 78a and 78b joining actuating cylinder 78 on either side of actuating piston 79. Line 76 is provided with a control valve 85.

The differential pressure or control impulse acting upon control piston 73a, b moves it against the force of spring 74. Fuel from pump 61 is forced through line 76 and across control edge 77a into actuating cylinder 78 and moves its piston 79 to the right. Variable stator 81 is slightly opened by means of linkage 80, so that the gas turbine gas mass flow and thus also differential pressure $q_1$ increase. This results in an increase in area $F_1$ and of the pressure at 68. The control cycle is only completed when the pressures are balanced. With zero pressure in cylinder 78, spring 82 acting upon actuating piston 79 opens the variable stator assembly. When the engine is started, the fuel supply is prevented by control valve 85 which only opens when the idling speed is exceeded. Operation is electrical through solenoid 86 energized by switch 87 which is actuated automatically when power control lever 55 is in idling position. In addition to pressure $p_{o3}$, temperature $T_{o1}$ is a controlling factor for area $F_2$. While the area is increased with rising pressure, it decreases when the temperature $T_{o1}$ increases which, for example can be measured by means of a vapour pressure thermometer 91 shown in FIG. 5. An additional temperature correction is made when $T_{o3}$ exceeds a certain value. In this case, base 93 for the control of area $F_2$ is shifted by the measuring device for $T_{o3}$.

For braking the vehicle, a special device is provided. The variable stator is adjusted through the fully open position into a position where the flow upon the blades of the free-power turbine wheel counteracts the rotation. For this purpose, another valve 95 located in line 76a is opened after control valve 85 is closed. The hydraulic pressure then moves actuating piston 70 into its extreme right hand position so that variable stator 81 is brought into reverse position via linkage 80. Valve 95 is operated by solenoid 96 which is energized through vehicle brake 97. The fuel supply and thus power is controlled by speed governor 54 in conjunction with the above-described variable guide vane control. In order to avoid interference of speed governor and variable stator control, an additional pump 101 is provided. When special provisions are made, only one pump is sufficient. Pump 101 supplied with fuel through supply line 60a is provided with filter 102 and relief valve 103 (FIG. 4c). With the differential pressure maintained constant the fuel then flows thruogh speed governor 54 designed as flyweight governor 100, the metering section of which therefore is proportional to the fuel flow. Differential pressure valve 104 keeps the differential pressure upstream and downstream of speed governor 54 constant via line 60b.

The speed regulator 54 is driven by shaft 105. Control sleeve 106 rotates to keep the frictional forces low. Flyweights 107, the force of which counteracts the force of spring 108, also rotate. The spring force is adjusted by power control lever 55 via linkage 109 and thus the speed or power is practically selected. When a permissible gas generator speed is exceeded, overspeed protection device 110 is tripped and opens fuel bypass 111 installed in line 60b. Another bypass 112 is opened when stopping the gas turbine. The minimum and maximum fuel flow can be set by stops 114 and 115 on governor 54. When free-power turbine speed $n_2$ exceeds its permissible value, associated overspeed governor 116 comes into action and governor 54 is operated towards reduced fuel flow via linkage 117. The fuel from speed governor 54 flows through line 118 and drain valve 119 to fuel nozzle 120 of the gas turbine. Under low fuel pressure which occurs immediately before the gas turbine comes to a standstill, the drain valve shuts off the fuel supply to the fuel nozzle. The fuel remaining in injection line 121 is then blown into drain pipe 122.

For additional safety, the fuel system is provided with an electrically operated valve 123 which keeps bypass 124 closed only when the system is energized. For transient conditions, the fuel system and the variable stator actuating system must operate in conjunction.

By linking the speed governing and guide vane actuating systems, an effect is to be achieved which will be described in more detail. When it is desired to change rapidly from a small load working point to greater load, the engine must be accelerated with excess fuel preferably with the stator vanes first in open position. This fuel supply may only be increased up to the working line as determined by the control law. At the same time, the stator assembly must be kept in open position and should not be closed before the desired speed is reached. In the embodiment of the control system according to the present invention as shown in FIGS. 4a–c, this is achieved by installing control cylinder 130 with control piston 130a and 130b into fuel metering line 118 with the position of the control piston depending upon the pressures sensed at measuring points 68 and 72. The control piston is subjected to spring force from both ends. From the control cylinder, the fuel can be directed both to the combustion chamber and to cylinder 134 across control edge 132. Cylinder 134 contains actuating piston 137 which is moved to the left against the force of spring 142 when subjected to pressure and closes valve 138 located in line 140. This line provides a connection between measuring point 68 and control cylinder 73.

As can further be seen from FIGS. 4a–c in the case of acceleration through power control lever 55 during a short period speed, governor 54 supplies an amount of fuel which might result in excessive operating temperature. This is indicated by an excessive differential pressure between measuring points 68 and 72 which is also utilized to influence the fuel system. For this purpose, control piston 130 is subjected to the pressure difference. When the pressure at measuring point 72 is of greater magnitude, then part of the fuel supplied through line 131 is directed into line 133 communicating with cylinder 134 containing actuating piston 137 after passing control edge 132 of control piston 130. The remaining fuel is passed to the fuel nozzle via line 135, 118 and 121 and additional safety devices. Depending upon the position of adjustable throttle device 136, the amount of fuel removed causes a differential pressure on actuating piston 137. When fuel flows away, valve 138 is closed partly or completely. Thus, the pressure from measuring point 68 is prevented to act upon control piston 73a. In line 140 connected to the fuel inlet side via an adjustable throttle device 141, a low pressure results which operates the control piston towards opening the variable stator assembly.

Figure 5:
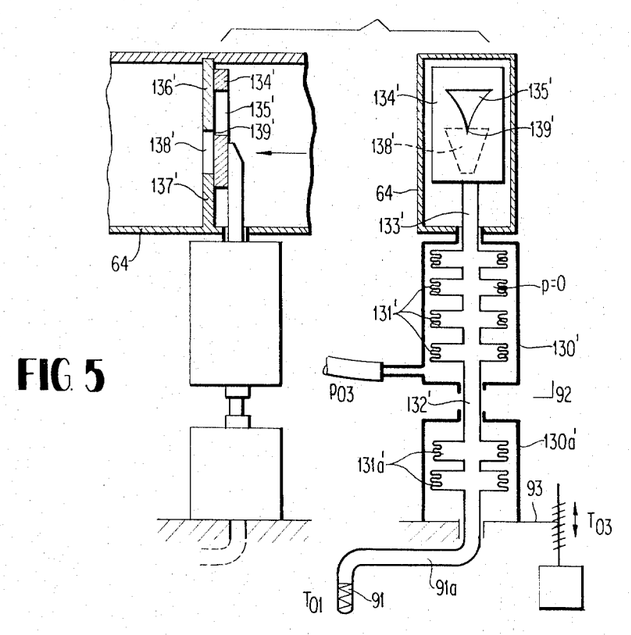
FIG. 5 is a front and side view of a first multiplying device.

The multiplication of measured values $p_{o3}$, $T_{o1}$ and $T_{o3}$ and the resulting sectional area $F_2$, 71 are shown in FIG. 5. In a pressure chamber 130', several bellows 131' communicating with each other are contained which externally are subjected to pressure $p_{o3}$ and internally to vacuum. In another pressure chamber 130a', bellows 131a' are also provided which are connected to bellows 131 through connecting rod 132'. In pressure chamber 130a', a pressure exists which, for example, results from a vapor pressure thermometer 91 at a certain temperature $T_{o1}$ which compresses bellows 131a' with the resulting movement being transmitted to bellows 131' via connecting rod 132'. The thermometer only comes into action when a temperature is reached which can be set by stop 92. Pressure chamber 130a' is located on plate 93 shown in its initial position which can be adjusted in the direction of the arrow according to turbine inlet temperature $T_{o3}$ which has been indicated by an adjusting screw. Bellows 131' are compressed by pressure $p_{o3}$ and their movement is transmitted to slide 134' the given opening 135' in comparative measuring tube 64 via connecting rod 113'. Slide 134' slides on face 136' of wall 137' provided wuth opening 138'. The two openings 135' and 138' overlap each other and leave sectional area 139'. The configuration of sectional area 139' must correspond to the given control function (the right side of Equation 5) so that the pressure function of $p_{o3}$ is proportional to area $F_1$, i.e., when a slide movement proportional to pressure $p_{o3}$ is selected, the opening sectional area associated with each slide position corresponds to the given control function. Thus the configuration of opening 135' follows an exponential function. The fuel passes through the opening as shown in FIG. 5 and causes a pressure drop.

Area $F_1$ according to FIGS. 4a–c, for example, is adjusted by the multiplying device as shown in FIG. 6. Pressure chamber 150 subjected to total pressure $p_{o1}$ via pipe 155 contains a number of bellows 151 communicating with each other, the interior of which is subjected to static pressure $p_1$ via line 152 so that differential pressure $q_1$ is the effective pressure. The bellows move slide 154 with opening 156 located in the comparative measuring tube via connection rod 153. In the figure the initial position is shown. Pressure chamber 161 with bellows 157 and connection rod 158 is arranged in a similar manner. Externally bellows 157 are subjected to pressure $p_{o1}$ and internally to a vacuum. To connecting rod 158, slide 159 with another opening 160 is fitted. Slide 159 which moves transversely to the movement of slide 154 slides on baseplate 149 arranged in comparative measuring tube 63. The initial position of the openings is adjusted by means of devices (not shown). The configuration of the openings and the spring characteristic determine the total area $F_1$ as left free by the openings as a function of the pressures. Essentially a multiplication of the pressures takes place with certain corrections being possible due to the opening configuration.

Figure 7:
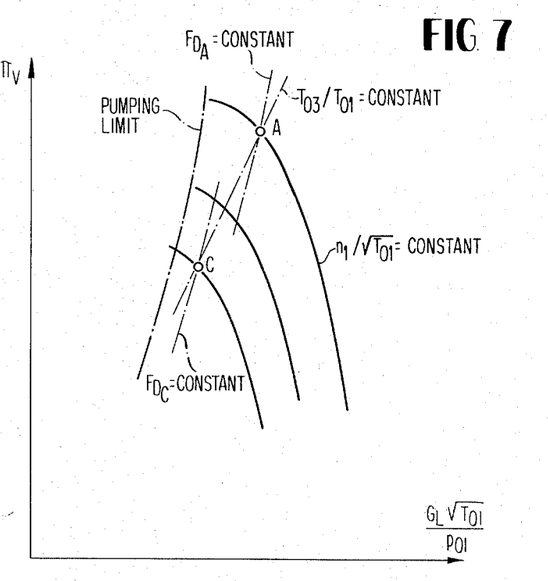
FIG. 7 shows typical compressor characteristics.

In compressor characteristics as shown in FIG. 7 wherein the gas generator compressor ratio is plotted versus the flow for various speeds, one off-design working point (C) is entered for a speed somewhat below the speed for full load (A). The turbine inlet temperature is approximately the same as under full load conditions and thus the pressure must be considerably throttled by means of the variable inlet geometry (throttling area $F_{D\,c}$ at working point C).

Figure 8:
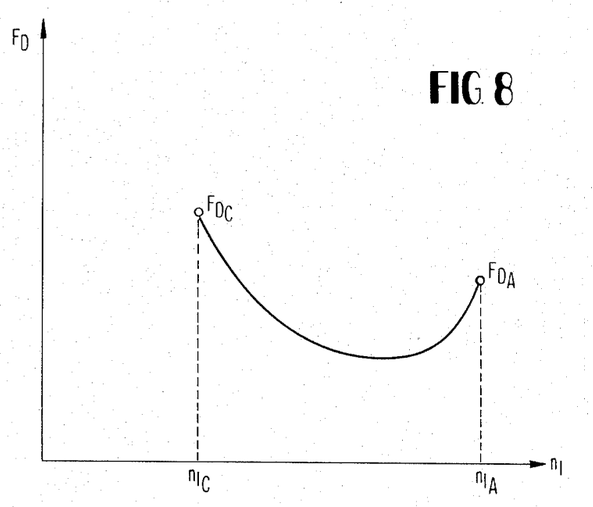
FIG. 8 shows the guide vane throat area $F_d$ as a function of the gas generator speed under transient conditions.

With increasing load the fuel flow must first increase and the stator vanes must be opened. It is advisable to open to a section which is greater than related to full load ($F_D$, A) shown in FIG. 8. In this case, the turbine inlet temperature $T_{o3}$ or temperature ratio $T_{o3}/T_{o1}$ must be approximately constant so that all the excess power is available for accelerating the gas generator. The stator vanes should be closed only when the desired speed (e.g. full load speed) is reached. The mechanism as shown in FIG. 4 ensures opening of the stator vanes and a high acceleration which continues until there is only a small speed increase or no increase at all.

While I have shown and described several embodiments in accordance with the present invention, it is to be clearly understood that the same is susceptible of numerous changes and modifications as will be apparent to one skilled in the art. I, therefore, do not wish to be limited to the details shown and described herein, but intend to cover all such changes and modifications as are encompassed by the scope of the present invention.

I claim:

1. Control system for gas turbines, comprising a gas generator operatively associated with a variable geometry unit with the working line of the gas generator geing adjusted to each related speed by variation of the geometry through the control system, characterized in that means is provided utilizing the control function $q_1 \cdot p_{o1} = f(T_{o1}) \cdot p_{o3}^\alpha\, k$ for positioning the gas generator working line and for at least one of acceleration and fuel supply, wherein $q_1$ is the ram pressure, $p_{o1}$ is the total pressure, $T_{o1}$ is the absolute temperature upstream of the compressor, $p_{o3}$ is the total pressure measured between the compressor and turbine, and $\alpha$ and $k$ are constant values, the positioning means including a control circuit for the variable geometry as well as a control circuit for the gas generator speed, the variable geometry control circuit comprising measuring points for the measuring values of the total pressure upstream of the compressor ($p_{o1}$) and ram pressure upstream of the compressor ($q_1$), first multiplying means for converting the measured values into a first signal proportional to the function utilized for positioning the working line and a function generator, regulator means for converting the measured value $p_{o3}$ to a value $p_{o3}^\alpha$, second multiplier means for converting the values $p_{o3}^\alpha$ and $T_{o2}]p_{o3}^\alpha$ and $f(T_{o1})$ which is a function of the measured value $T_{o1}$ into a second signal according to the control function so that the first signal is compared with the second signal, and the differential signal generated in the function generator constitutes a control impulse for enabling adjustment of the geometry geomerry.

2. Control system according to claim 1, wherein the variable geometry unit includes variable guide vanes upstream of a free-power turbine of a two-shaft engine having a heat exchanger, wherein the heat of the combustion gases is transferred to the air compressed in the gas generator.

3. Control system according to claim 1, wherein the gas turbine is a turbojet engine and the variable geometry unit includes a variable geometry thrust nozzle in the turbojet engine.

4. Control system according to claim 1, wherein the function $f(T_{o1})$ is equal to a constant value below a temperature $T_{o1}$.

5. Control system according to claim 1, wherein the positioning means utilizing the control function comprises at least one of mechanical, electronic hydraulic, pneumatic components and combinations thereof.

6. Control system according to claim 1, wherein the first multiplying means comprises a first pressure chamber subjected to total pressure ($p_{o1}$) containing a plurality of bellows operatively communicated with each other and subjected to static pressure ($p_1$), a first slide having an opening and being operatively connected with the bellows by a first connecting rod, and a second pressure chamber subjected to total pressure ($p_{o1}$) containing a plurality of evacuated bellows operatively communicated with each other, a second slide having an opening and being operatively connected with the evacuated bellows by a second connecting rod, the second slide contacting the first slide and the second connecting rod being arranged normal to the first connecting rod, the openings in the first and second slides providing a flow cross-sectional area ($F_1$) which is proportional to the product of $p_{o1}$ and $q_i$.

7. Control system according to claim 1, wherein the second multiplying means comprises a first pressure chamber subjected to pressure ($p_{o3}$) and a second pressure chamber subjected to pressure corresponding to intake temperature ($T_{o1}$), both pressure chambers containing a plurality of aligned evacuated bellows which are operatively connected to each other by a connecting rod and which are connected to a slide with an opening corresponding to an exponential function by means of a second connecting rod, and the slide being movable on a face member having an opening, the openings of the slide and face member providing a flow cross-sectional area ($F_2$).

8. Control system according to claim 7, wherein the first multiplying means comprises a first pressure chamber subjected to total pressure ($p_{o1}$) containing a plurality of bellows operatively communicated with each other and subjected to static pressure ($p_1$), a first slide having an opening and being operatively connected with the bellows by a first connecting rod, and a second pressure chamber subjected to total pressure ($p_{o1}$) containing a plurality of evacuated bellows operatively communicated with each other, a second slide having an opening and being operatively connected with the evacuated bellows by a second connecting rod, the second slide contacting the first slide and the second connecting rod being arranged normal to the first connecting rod, the openings in the first and second slides providing a flow cross-sectional area ($F_1$).

9. Control system according to claim 1, wherein the gas generator speed control circuit compares the speed signal of the gas generator with the value selected by a power control lever and includes speed governor means influencing fuel flow which, in certain speed ranges, is also influenced by the speed of a free-power turbine.

10. Control system according to claim 9, wherein the function $f(T_{o1})$ is equal to a constant value below a temperature $T_{o1}$.

11. Control system according to claim 10, wherein a linear temperature function $f(T_{o1}) = K_2 [T_{oo} + (T_{o1} - T_{oo})]$ based on an ambient temperature $T_{oo}$ is selected, and $K_2$ represents a constant and $T_{o1}$ the intake temperature.

12. Control system according to claim 1, wherein speed governor means is provided for setting the gas generator speed which controls the supply of fuel to the combustion chamber.

13. Control system according to claim 12, wherein the speed governor means is a flyweight-governor with springs counteracting the centrifugal force being preloaded by a power control lever.

14. Control system according to claim 1, wherein fuel supply limiting means is provided for adjusting the control function.

15. Control system according to claim 14, wherein the fuel supply limiting means is an acceleration governor.

16. Control system according to claim 2, wherein speed governor means is provided for limiting the speed of the free-power turbine by controlling the gas generator speed.

17. Control system according to claim 2, wherein signal transmitter means is provided for indicating an upper and a lower limit for the gas generator and free-power turbine speed related to each other.

18. Control system according to claim 1, wherein means is provided for opening of the variable geometry both during starting and also at least up to idling speed.

19. Control system according to claim 1, wherein means is provided for generating a signal for adjustment of the variable geometry during transient operating conditions and power variations due to a difference between products appearing in the control function.

20. Control system according to claim 19, wherein the variable geometry unit includes variable guide vanes upstream of a free-power turbine of a two-shaft engine having a heat exchanger, wherein the heat of the combustion gases is transferred to the air compressed in the gas generator.

21. Control system according to claim 20, wherein means are provided for the overspeed protection both for the gas generator and the free-power turbine.

22. Control system according to claim 6, wherein the second pressure chamber is adjustable as a function of temperature ($T_{o3so\ o3}$) a maximum permissible temperature in the gas generator and turbine inlet or outlet can be maintained according to the control function by automatic adjustment.

23. Control system according to claim 8, wherein the second pressure chamber is adjustable as a function of temperature ($T_{o3}$) so that a maximum permissible temperature in the gas generator and turbine inlet or outlet can be maintained according to the control function by automatic adjustment.

24. Control system according to claim 23, wherein the function generator compares the two signals and comprises two comparative measuring tubes, and the comparative measuring tubes include orifices, with the prevailing pressure being sensed downstream of the flow cross-sectional areas ($F_1$ and $F_2$) at measuring points.

25. Control system according to claim 24, wherein the correcting condition of greater magnitude of the control impulse as sensed on the comparative measuring tube serves for adjusting the variable geometry.

26. Control system according to claim 25, wherein the variable geometry unit includes variable guide vanes upstream of a free-power turbine of a two-shaft engine having a heat exchanger, wherein the heat of the combustion gases is transferred to the air compressed in the gas generator.

27. Control system according to claim 25, wherein a comparison bridge connection means is provided for comparing the two functions of the control function.

28. Control system according to claim 26, wherein with the correcting conditions used as a control impulse, the control impulse serves for adjusting control piston means arranged in a cylinder connected to an actuating cylinder containing actuating piston means for the guide vane variation via lines which are alternatively closed by control edges.

29. Control system according to claim 28, wherein a comparison bridge connection means is provided for comparing the two functions of the control function.

30. Control system according to claim 26, wherein a control cylinder having control piston means disposed therein is operatively arranged between the pressures sensed at the measuring points in the comparative measuring tubes and directs fuel from a speed governor across control edges both to the combustion chamber and to another cylinder, and a spring-loaded actuating piston means arranged in said another cylinder is provided for operating a valve located in a pressure line between one measuring point and an actuating cylinder.

31. Control system according to claim 30, wherein the valve closes the pressure line during acceleration so that the guide vanes remain in open position.

32. Control system according to claim 28, wherein a valve for the actuation of the guide vanes is arranged upstream of the actuating cylinder which opens a line, when a brake lever means is operated, to allow pivoting of the guide vanes into an opposite direction.

33. Control system for gas turbines, comprising a gas generator operatively associated with a variable geometry unit with the working line of the gas generator being adjusted to each related speed by variation of the geometry through the control system, characterized in that means is provided utilizing the control function $q_1 \cdot (x \cdot p_{o1}{}^\alpha + y \cdot p_{o1}{}^\beta + \ldots + z_n \cdot p_{o1}{}^\delta ) = f(T_{o1}) \cdot (a \cdot p_{o3}{}^\alpha + b \cdot p_{o3}{}^\beta + \ldots + z \cdot p_{o3}{}^\delta )k$, for positioning the gas generator working line and for at least one of acceleration and fuel supply, wherein $q_1$ is the ram pressure, $p_{o1}$ is the total pressure, $T_{o1}$ is the absolute pressure upstream of the compressor, $p_{o3}$ is the total pressure measured between the compressor and the turbine, wherein $x$, $y$, $z_n$, $k$, $a$, $b$, $z$, $\alpha$ $\beta$, and $\delta$ are constants, the positioning means including a control circuit for the variable geometry as well as a control circuit for the gas generator speed, the variable geometry control circuit comprising measuring points for the measuring values of the total pressure upstream of the compressor ($p_{o1}$) and ram pressure upstream of the compressor ($q_1$), first multiplying means for converting the measured values into a first signal proportional to the function utilized for positioning the working line and a function generator, measuring points for the measuring values of $p_{o3}$ and $T_{o1}$, means for converting the measured values $p_{o3}$ and $T_{o1}$ to values ($a \cdot p_{o3}{}^\alpha + b \cdot p_{o3}{}^\beta + \ldots + z \cdot p_{o3}{}^\delta$ ) and $f(T_{o1})$, second multiplier means for converting the values ($a \cdot p_{o3}{}^\alpha + b \cdot p_{o3}{}^\beta + \ldots + z \cdot p_{o3}{}^\delta$ ) and $f(T_{o1})$ into a second signal according to the control function so that the first signal is compared with the second signal, and the differential signal generated in the function generator constitutes a control impulse for enabling adjustment of the variable geometry.

34. Control system according to claim 33, wherein a linear temperature function $f(T_{o1}) = K_2 [T_{oo} + (T_{o1} - T_{oo})]$ based on an ambient temperature $T_{oo}$ is selected, and $K_2$ represents a constant and $T_{o1}$ the intake temperature.

35. Control system according to claim 34, wherein the function $f(T_{o1})$ is equal to a constant value below a temperature $T_{o1}$.

\* \* \* \* \*